3,545,901
ROTOR FOR ROTARY PISTON ENGINES
Adolf Belzner, Heilbronn-Neckargartach, Germany, assignor to NSU Motorenwerke Aktiengesellschaft, Neckarsulm, and Wankel G.m.b.H., Lindau (Bodensee), Germany
Filed Jan. 27, 1969, Ser. No. 793,952
Claims priority, application Germany, Feb. 16, 1968, 1,601,826
Int. Cl. F01c 21/00, 21/02; F16c 17/04
U.S. Cl. 418—179
3 Claims

ABSTRACT OF THE DISCLOSURE

An improved rotor for a rotary-piston engine which rotor is supported for rotation and axial movement between spaced end walls of the housing of the rotary piston engine. The rotor has a body portion formed to have a plurality of circumferentially spaced apex portions about its periphery and opposite end faces lying in planes perpendicular to the axis of rotation. A plurality of removable wear members are receivable in complementary shaped recesses formed in each of the end faces of the rotor. Each of the wear members is dimensioned in relation to its associated recess so that a distal portion of the wear member lies slightly beyond the plane of the end face so as to engage the end walls of the housing and thereby limit axial movement of the rotor. Each of the wear members is composed of a material having self-lubricating characteristics.

BACKGROUND OF THE INVENTION

This invention relates to rotary mechanisms, such as rotary-piston engines of the trochoidal type and is more particularly directed to end face bearing means for axially positioning the rotor of such rotary mechanisms.

In rotary mechanisms, similar to the type disclosed in U.S. Pat. 2,988,065, a rotor of substantially cylindrical shape, having substantially plane end surfaces extending perpendicular to the axis of rotation, is supported for rotation eccentrically between two substantially planar, parallel end walls of an outer casing or housing. In this type of mechanism, fluid sealing means, such as rings and bars, are provided in the opposite end face surfaces of the rotor to seal the interstices between the rotor and housing. In addition, it is necessary to provide bearing means for maintaining the rotor in axial position relative to the end walls of the housing to insure the effectiveness of the seal means on each end face of the rotor. Heretofore, various bearing means have been devised to axially position the rotor for rotation within the housing. One such bearing means is disclosed in the United States patent to Baumber et al., No. 3,193,052, wherein a plurality of projections are provided to extend from the end surfaces of the rotor to engage the adjacent end wall surfaces of the housing. Another bearing means is disclosed in the U.S. Pat. No. 3,261,542, to Jones wherein the rotor has an integral, annular protuberance extending from each of the opposite end surfaces of the rotor. These various bearing constructions have the disadvantage of being subject to relatively rapid wear, which can lead to excessive wear and the resultant inoperativeness and/or failure of the side-face sealing means. Another disadvantage of the heretofore known end face bearings is that, upon excessive wear of the bearings, the entire rotor must be replaced.

It is therefore an object of this invention to provide an improved end face bearing means for the rotor of a rotary-piston engine having a longer operative life than heretofore known end face bearing devices.

Another object of the present invention is to provide an improved end face means for the rotor of a rotary piston engine which may be replaced quickly and easily.

SUMMARY OF THE INVENTION

Accordingly, it is contemplated by this invention to provide a rotor for a rotary-piston engine with a novel end face bearing means to limit axial movement of the rotor relative to the housing end walls of the rotary-piston engine. The bearing means comprises, in each end face of the rotor, a plurality of spaced wear members suitably secured within recesses in the body of the rotor so that the outer surface of each wear member lies in a plane beyond the end face surface of the rotor to engage the end walls of the housing and thereby restrict axial movement of the rotor. Each of the wear members is constructed of a material having self-lubricating characteristics, as for example, a graphite type composition, bronze, sintered alloy compositions, or the like.

The invention will be more fully understood from the following detailed description thereof when considered in connection with the accompanying drawings wherein one embodiment of the invention is illustrated by way of example, and in which:

DESCRIPTION OF THE PREFERRED EMBODIMENT

Figure 1:
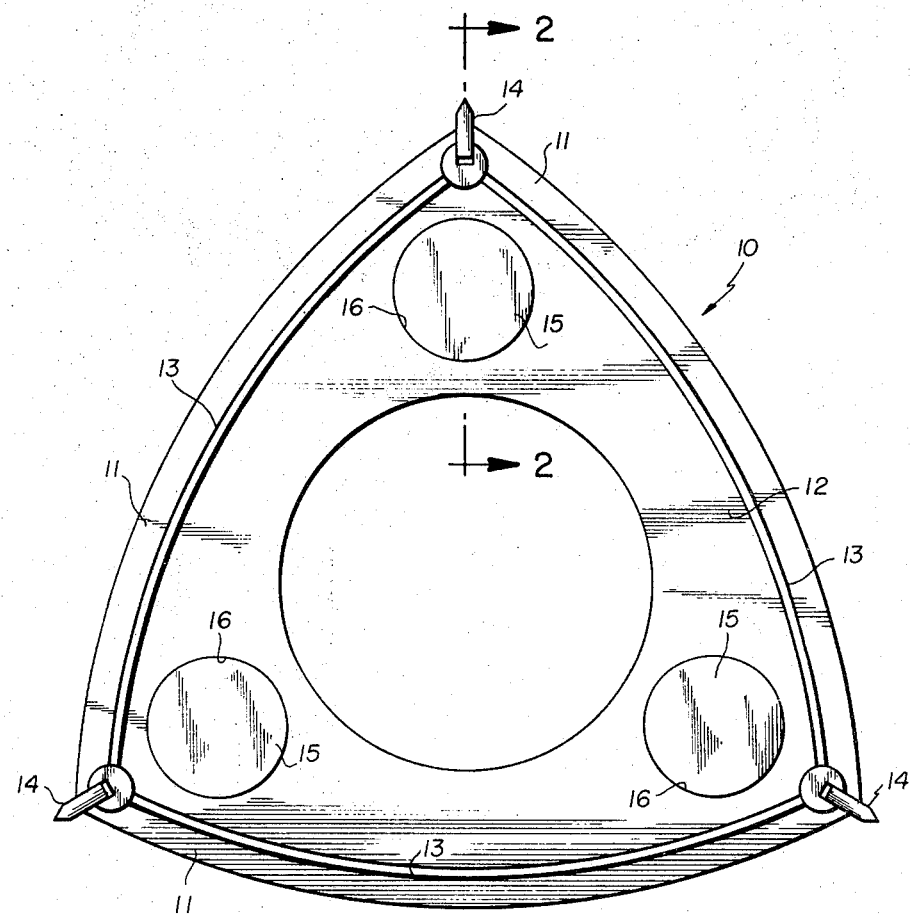
FIG. 1 is a view, in elevation, of a rotor of an epitrochoidal rotary-piston engine having an end face bearing means according to this invention.

Now referring to the drawings and more specifically to FIG. 1, the reference number 10 generally designates a rotor of a rotary-piston engine of the type having an epitrochoidal shaped housing (not shown), the rotor being supported for rotation on an eccentric (not shown) within the housing (not shown). The rotor 10 comprises a body having a plurality of circumferentially spaced apex portions 11 about its periphery and opposite end faces 12. To effect a fluidtight seal between each of the end faces 12 of rotor 10 and the next adjacent end wall of the housing (not shown), seal members 13 are mounted in each of the end faces 12 of the rotor. Also, radially movable end seal means 14 are provided at the apex portions 11 of rotor 10, as is customary and well known to those skilled in the art.

Figure 2:
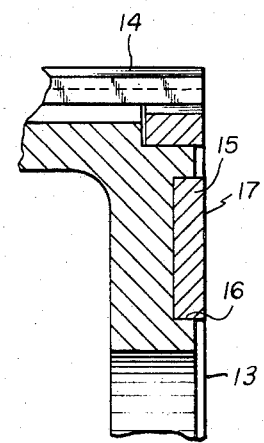
FIG. 2 is a fragmentary cross-sectional view taken along line 2—2 of FIG. 1 of one of the wear members of the end bearing means shown in FIG. 1.

To limit axial movement of rotor 10 within the housing (not shown), a bearing means comprising a plurality of spaced wear members 15 are disposed within recesses or depressions 16 in each end face 12 of rotor 10. As best shown in FIG. 2 each wear member 15 is dimensioned, in relation to the depth of its associated depression 16, such that the distal surface 17 of the wear member is in a plane spaced slightly beyond the planar surface of end face 12, as for example, 0.1 mm.

Each wear member 15 is preferably composed of a material having self-lubricating characteristics, as for example, carbon alloy, bronze, sintered material or the like.

It is also preferable merely to press each wear member 15 in its associated recess 16, or to secure it in place with an adhesive so that upon a predetermined wear of the members, the members may be readily removed and replaced by new wear members.

It is not necessary to secure the wear members 15 in recesses 16 by such means as swaging, welding or bonding, since the wear members 15 of an end face 12 are only subjected to forces directed inwardly toward the end face 12.

While wear members 14 and their associated recesses 16 may be of any desired complementary shape without departing from the scope and spirit of this invention, it is preferable to provide circular recesses 16 and wear members 15 of disk shape since this is the configuration which lends itself most readily to fabrication and assembly.

It is believed now apparent that the present invention provides, in a rotary-piston engine of the trochoidal type, a rotor having an improved bearing means for limiting axial movement of the rotor, which bearing means has a relatively long operative life due to a low wear rate and which may be removed and replaced easily and quickly.

Although but one embodiment of the invention has been illustrated and described in detail, it is to be expressly understood that the invention is not limited thereto. Various changes can be made in the arrangement of parts without departing from the scope and spirit of the invention as the same will now be understood by those skilled in the art.

What is claimed is:

1. A rotor for a rotary-piston combustion enging supported for rotation between spaced end walls of the housing of the rotary piston engine, said rotor comprising:
    (a) body portion having a plurality of circumferentially spaced apex portions about its periphery and opposite end faces;
    (b) a plurality of wear members having self-lubricating characteristics each of which is receivable in a complementary recess in each of the apex portions of the opposite end faces of the rotor;
    (c) the wear members and recesses being dimensioned so that the distal end portion of each wear member lies in a plane outwardly of the associated end faces to limit axial movement of the rotor between the housing end walls;
    (d) said wear members being readily removable from its associated recess for insertion of a replacement wear member.

2. The apparatus of claim 1, wherein each of said wear members are disk shaped and receivable in a circular recess.

3. The apparatus of claim 1, wherein each of said wear members is composed of graphite-type composition.

References Cited

UNITED STATES PATENTS

| | | | |
|---|---|---|---|
| 1,695,750 | 12/1928 | Whiteley | 308—239 |
| 2,117,550 | 5/1938 | Eynon et al. | 308—(PM) |
| 3,059,584 | 10/1962 | Cottell | 103—126(BA) |
| 3,062,599 | 11/1962 | Campbell | 308—239 |
| 3,102,520 | 9/1963 | Schlor | 123—8(SS) |
| 3,193,052 | 7/1965 | Baumler et al. | 123—8(SS) |
| 3,261,542 | 7/1966 | Jones | 230—145 |
| 3,436,129 | 4/1969 | James | 308—239 |

CARLTON R. CROYLE, Primary Examiner

WILBUR J. GOODLIN, Assistant Examiner

U.S. Cl. X.R.

308—238, 239; 418—270